United States Patent
Xu et al.

(10) Patent No.: US 8,649,311 B2
(45) Date of Patent: Feb. 11, 2014

(54) METHOD AND SYSTEM FOR TRANSMITTING LOGICAL CHANNEL IDENTIFIER IN MBMS

(76) Inventors: Hui Xu, Shenzhen (CN); Jian Zhang, Shenzhen (CN); Zijiang Ma, Shenzhen (CN)

( * ) Notice: Subject to any disclaimer, the term of this patent is extended or adjusted under 35 U.S.C. 154(b) by 163 days.

(21) Appl. No.: 13/257,867

(22) PCT Filed: Dec. 24, 2009

(86) PCT No.: PCT/CN2009/076007
§ 371 (c)(1),
(2), (4) Date: Dec. 7, 2011

(87) PCT Pub. No.: WO2010/148619
PCT Pub. Date: Dec. 29, 2010

(65) Prior Publication Data
US 2012/0087295 A1    Apr. 12, 2012

(30) Foreign Application Priority Data

Jun. 26, 2009    (CN) .......................... 2009 1 0088326

(51) Int. Cl.
*H04H 20/71*    (2008.01)
(52) U.S. Cl.
USPC ........................................................ 370/312
(58) Field of Classification Search
USPC ........................................................ 370/312
See application file for complete search history.

(56) References Cited

U.S. PATENT DOCUMENTS

| 2004/0117860 | A1 | 6/2004 | Yi et al. | |
| 2010/0159822 | A1* | 6/2010 | Lim et al. | 455/3.06 |
| 2010/0309788 | A1* | 12/2010 | Ho et al. | 370/236 |
| 2011/0038296 | A1* | 2/2011 | Yi et al. | 370/312 |
| 2012/0327855 | A1* | 12/2012 | Lee et al. | 370/328 |

FOREIGN PATENT DOCUMENTS

| CN | 1643820 A | 7/2005 |
| CN | 101160752 A | 4/2008 |
| CN | 101166193 A | 4/2008 |
| CN | 101437298 A | 5/2009 |
| JP | 2005535268 A | 11/2005 |
| JP | 2007522776 A | 8/2007 |

(Continued)

OTHER PUBLICATIONS

3rd Generation Partnership Project, 3GPP TS 36.300 V9.0.0 Jun. 18, 2009.
International Search Report in international application No. PCT/CN2009/076007, mailed on Apr. 8, 2010.

(Continued)

*Primary Examiner* — Sulaiman Nooristany
(74) *Attorney, Agent, or Firm* — Oppedahl Patent Law Firm LLC

(57) ABSTRACT

The present invention discloses a method for transmitting a logical channel identifier in a Multimedia Broadcast Multicast Service (MBMS), it comprises: an evolved Node B (eNB) notifies a User Equipment (UE) of a radio frame or a radio subframe carrying an MBMS Control Channel (MCCH) through a system broadcast message; and the UE reads a Medium Access Control (MAC) head from the radio frame or radio subframe, identifies the type of a logical channel according to the MAC head, and reads data from an MAC Service Data Unit (SDU). The present invention also discloses a system for transmitting a logical channel identifier in an MBMS. By adopting the present invention, the UE can accurately identify the type of the logical channel when various types of MBMS logical channels multiplex on the same MAC Protocol Data Unit (PDU).

13 Claims, 4 Drawing Sheets an eNB notifies a UE of a radio frame or a radio subframe carrying an MCCH through a system broadcast message — 101 the UE reads an MAC head from the radio frame or the radio subframe, identifies the type of a logical channel according to the MAC head, and reads data from an MAC SDU — 102

(56) References Cited

FOREIGN PATENT DOCUMENTS

| | | | |
|---|---|---|---|
| KR | 20050032949 | A | 4/2005 |
| WO | 2006109900 | A1 | 10/2006 |
| WO | 2009054655 | A2 | 4/2009 |

OTHER PUBLICATIONS

English Translation of the Written Opinion of the International Search Authority in international application No. PCT/CN2009/076007, mailed on Apr. 8, 2010.

* cited by examiner

METHOD AND SYSTEM FOR TRANSMITTING LOGICAL CHANNEL IDENTIFIER IN MBMS

TECHNICAL FIELD

The present invention relates to a technology of control signaling transmission in a Multimedia Broadcast Multicast Service (MBMS) in a Long Term Evolution (LTE) system, and more particularly relates to a method and system for transmitting a logical channel identifier in an MBMS.

BACKGROUND

With the rapid development of internet, a large number of mobile data multimedia services and various high bandwidth multimedia services have emerged, such as video conferencing, TV broadcasting, video on demand, advertising, online education, interactive games, etc., which can not only meet the increasing service needs of mobile users, but also bring new service growth points to mobile operators. These mobile data multimedia services enable multiple users to receive the same data simultaneously. Compared with general data services, these mobile data multimedia services have characteristics such as large data volume, long duration, and delay sensibility, etc.

In order to effectively make use of mobile network resources, the $3^{rd}$ Generation Partnership Project (3GPP) proposes a Multimedia Broadcast Multicast Service (MBMS). This service is a technology of data transmission from a data source to multiple targets, which realizes network (including a core network and an access network) resources sharing and improves the utilization of network resources, especially the utilization of air interface resources. The MBMS defined by the 3GPP can realize not only the broadcast and multicast of low-rate text messages but also the broadcast and multicast of high-speed multimedia services, and provide varieties of video, audio, and multimedia services. These also conform to the future trend of mobile data development and provide better service prospects for the development of the 3G mobile communication technology.

The design of an MBMS Multicast Control Channel (MCCH) in the ninth version (Rel-9) of LTE does not adopt a layered structure, i.e., there is only one MCCH in a Multicast/ Broadcast over Single Frequency Network (MBSFN), and resource location information of the MCCH is indicated by a Broadcast Control Channel (BCCH).

In the LTE MBMS, the services and functions provided by a Media Access Control (MAC) layer on a network side include scheduling, logical channel multiplexing and service identifier (ID), etc.; the services and functions provided by the MAC layer on a terminal side include logical channel de-multiplexing and reading of a service identifier, etc. The logical channel multiplexing includes the multiplexing of an MCCH and a Multicast Traffic Channel (MTCH), both of which can be multiplexed on the same MAC Protocol Data Unit (PDU) according to the LTE protocol. However, for the multiplexing of the MCCH and the MTCH, the prior art has not provided an effective solution to the problem that how to identify the type of a logical channel (including MCCH, MTCH, etc.) by a User Equipment (UE), which results in failure of the UE to accurately identify the type of the logical channel when various types of MBMS logical channels multiplex on an is MAC PDU, thus causing abnormal operation of the services, and bringing inconvenience to practical applications.

SUMMARY

In view of this, the main purpose of the present invention is to provide a method and system for transmitting a logical channel identifier in an MBMS, so as to provide an effective solution to the problem that a UE is unable to accurately identify the type of a logical channel when various types of MBMS logical channels multiplex on an MAC PDU.

To achieve the above purpose, the technical scheme of the present invention is performed as follows.

The present invention provides a method for transmitting a logical channel identifier in a Multimedia Broadcast Multicast Service (MBMS), which comprises:

an evolved Node B (eNB) notifies a User Equipment (UE) of a radio frame or a radio subframe carrying an MBMS Control Channel (MCCH) through a system broadcast message; and the UE reads a Medium Access Control (MAC) head from the radio frame or the radio subframe, identifies the type of a logical channel according to the MAC head, and reads data from an MAC Service Data Unit (SDU).

The method may further comprise: the UE identifies the type of the logical channel according to an MBMS service identifier or a Logical Channel Identifier (LCID) in the MAC head.

The step that the UE identifies the type of the logical channel according to an MBMS service identifier may specifically comprise:

determining that the type of the logical channel is an MCCH if the MBMS service identifier is 1111; and determining that the type of the logical channel is a Multicast Traffic Channel (MTCH) if the MBMS service identifier belongs to 0000~1110.

The step that the UE identifies the type of the logical channel according to an LCID is may specifically comprise:

determining that the type of the logical channel is an MCCH if the LCID is 00000; and determining that corresponding content is a padding part if the LCID is 11111.

The step of reading data from an MAC SDU may specifically comprise: determining a location of data in the MAC SDU corresponding to the type of the logical channel according to a field of indicating the length of an MAC data field in the MAC head, thus reading the data from the location.

The present invention also provides a system for transmitting a logical channel identifier in an MBMS, it comprises an eNB and a UE, wherein the eNB is used to notify the UE of a radio frame or a radio subframe carrying an MCCH through a system broadcast message; and the UE is used to read an MAC head from the radio frame or the radio subframe, identify the type of a logical channel according to the MAC head, and read data from an MAC SDU.

The UE may be further used to identify the type of the logical channel according to an MBMS service identifier or an LCID in the MAC head.

The UE may be further used to determine that the type of the logical channel is an MCCH when the MBMS service identifier is 1111, and determine that the type of the logical channel is an MTCH when the MBMS service identifier belongs to 0000~1110.

The UE may be further used to determine that the type of the logical channel is an MCCH when the LCID is 00000, and determine that corresponding content is a padding part when the LCID is 11111.

The UE may be further used to determine a location of data in the MAC SDU corresponding to the type of the logical channel according to a field of indicating the length of an MAC data field in the MAC head, thus read the data from the location.

The present invention provides a method and system for transmitting a logical channel identifier in an MBMS, in which a UE reads an MAC head from a radio frame or a radio subframe when an eNB notifies the UE of the radio frame or the radio subframe carrying an MCCH through a system broadcast message, identifies the type of a logical channel according to an MBMS service identifier or an LCID in the MAC head, and reads data from a corresponding MAC SDU. By the present invention, the UE can accurately identify the type of the logical channel when various types of MBMS logical channels multiplex on the MAC PDU, and thus ensure normal operation of the services, and bring convenience to practical applications.

DETAILED DESCRIPTION

The technical scheme of the present invention will be illustrated in detail hereinafter with reference to the drawings and specific embodiments.

Figure 1:
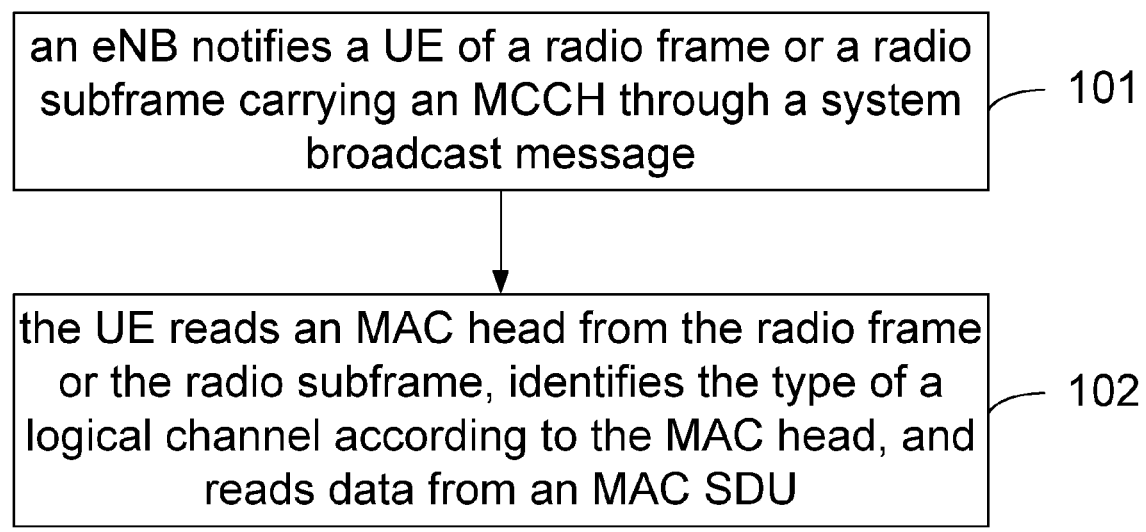
FIG. 1 is a flowchart illustrating a method for transmitting a logical channel identifier in an MBMS according to the present invention.

The present invention provides a method for transmitting a logical channel identifier in an MBMS, as shown in FIG. 1, it comprises the following steps.

Step 101: an evolved Node B (eNB) notifies a UE of a radio frame or a radio subframe carrying an MCCH through a system broadcast message.

The eNB sends location information of the radio frame or the radio subframe carrying the MCCH to the UE through the system broadcast message.

Step 102: the UE reads a Medium Access Control (MAC) head from the radio frame or the radio subframe, identifies the type of a logical channel according to the MAC head, and reads data from an MAC Service Data Unit (SDU).

Figure 2:
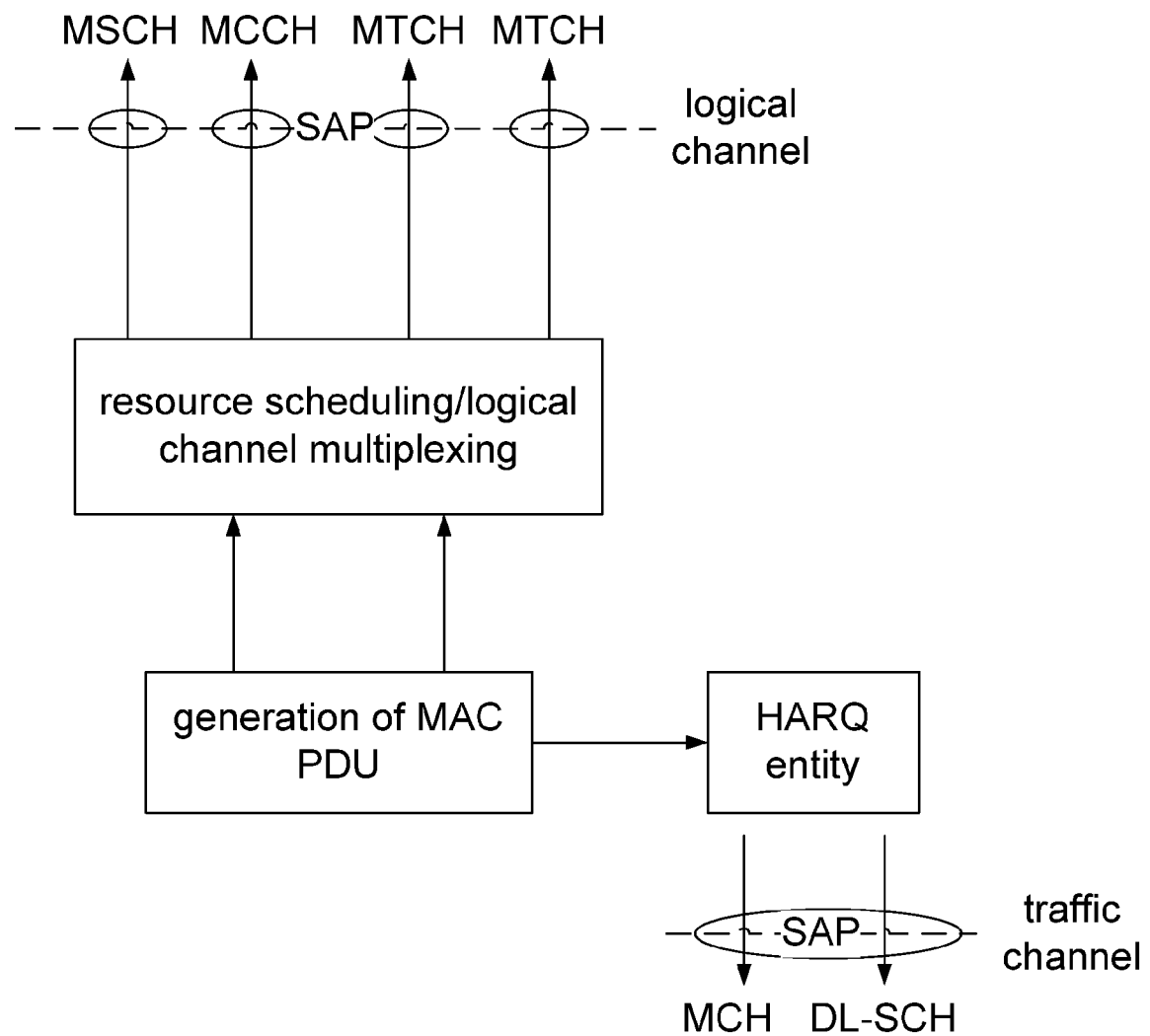
FIG. 2 is a schematic diagram illustrating an MAC sublayer structure on a network side according to the present invention.
Figure 3:
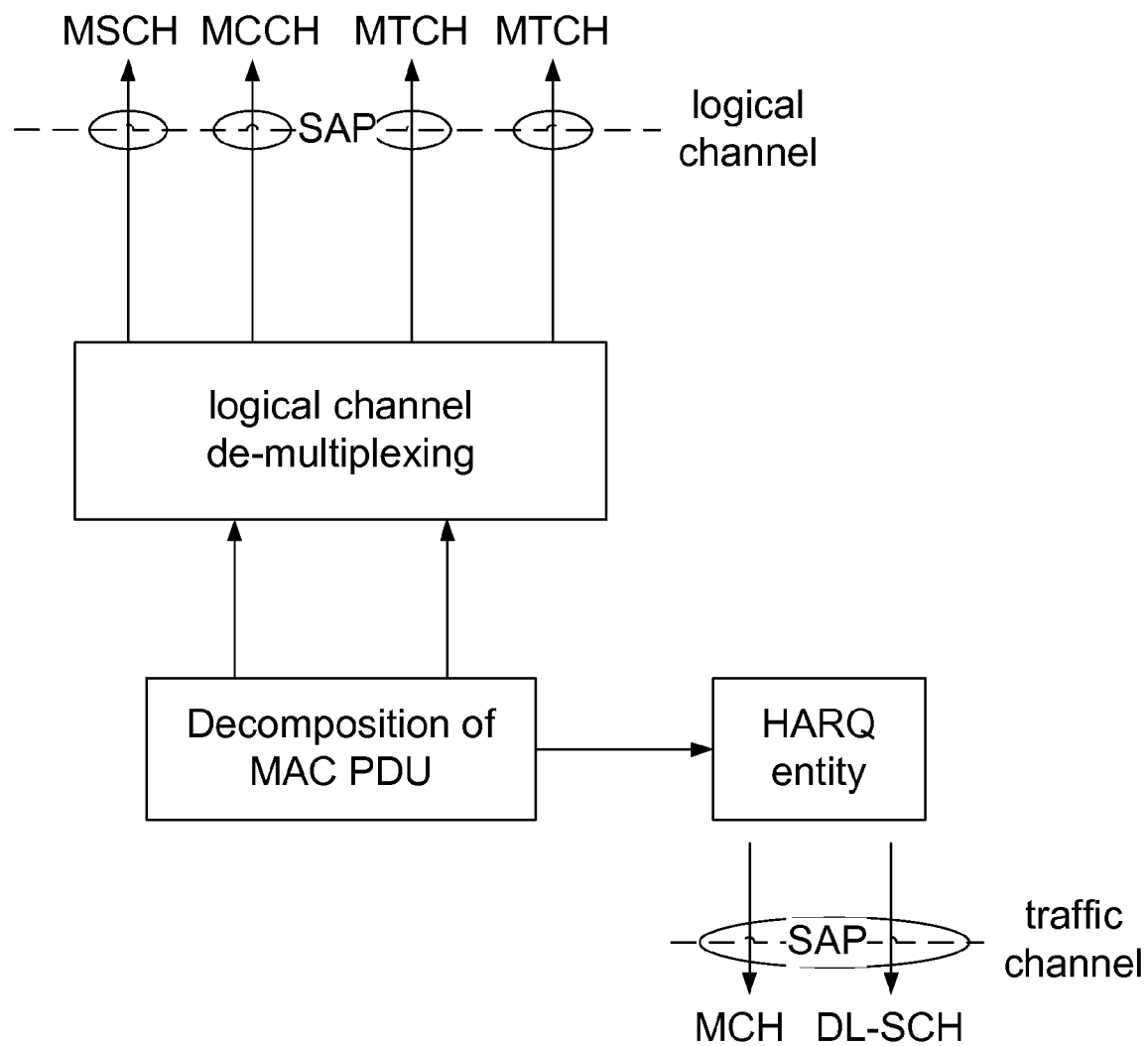
FIG. 3 is a schematic diagram illustrating an MAC sublayer structure on a UE side according to the present invention.

For a simple scenario, i.e., only two logical channels, an MCCH and an MTCH, multiplex on an MAC sublayer, an MBMS service ID can be used to distinguish the MCCH from the MTCH. Since the length of the MBMS service ID is 4 bits, wherein 1111 is a reserved value, the MCCH may be indicated by 1111, specifically comprising:

Evolved Universal Telecommunication Radio Access (E-UTRA) defines two MAC entities, one is in a UE, and the other is in an Evolved Universal Terrestrial Radio Access Network (E-UTRAN). A downlink MAC sublayer structure on the network side is shown in FIG. 2, and an MAC sublayer structure on the UE side is shown in FIG. 3, wherein a Service Access Point (SAP) represents the type of a channel between different sublayers. The SAP between the MAC sublayer and layer 1 is a traffic channel, and the SAP between the MAC sublayer and a Radio Link Control (RLC) layer is a logical channel. A Multicast Scheduling Channel (MSCH), an MCCH, and an MTCH in the figures are logical channels in the MBMS, while a Multicast Channel (MCH) and a Downlink-Shared Channel (DL-SCH) are traffic channels. The MAC sublayer performs mapping between the traffic channels and the logical channels. An MAC PDU comprises an MAC head, an MAC SDU and an MAC control element. A Hybrid Automatic Repeat Request (HARQ) entity is responsible for retransmission control when MAC data is lost.

Figure 4:
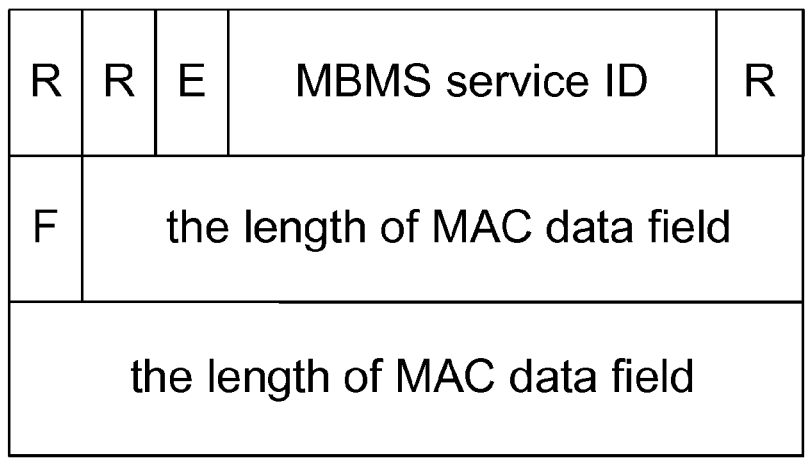
FIG. 4 is a schematic diagram illustrating an MAC sub-head structure according to the first embodiment of the present invention.

A corresponding MBMS service ID is set in the MAC head by the eNB according to is the type of a logical channel. The MAC head is composed of a large number of MAC sub-heads shown in FIG. 4, wherein 1111 represents that the type of a corresponding logical channel in the MAC SDU is an MCCH, and the other values (0000~1110) except 1111 represent different MTCHs.

An MAC Extension (E) field is used to identify whether there is a field of indicating the length of an MAC data field in the MAC head or not. If E=1, then it indicates that the MAC head is extended, i.e., there is a field of indicating the length of the MAC data field in the MAC head; otherwise, it indicates that the MAC head is not extended, i.e., there is no field of indicating the length of the MAC data field in the MAC head.

In order to be consistent with the MAC head on the DL-SCH, the field of indicating the length of the MAC data field can be 15 bits or 7 bits, the specific value of which can be determined by a Flag (F) symbol in an MAC sub-head, i.e., if F=1, then the specific value is 15 bits; if F=0, then the specific value is 7 bits. The field of indicating the length of the MAC data field is used to perform demarkation processing on different MAC SDUs in the MAC PDU. For an MAC control element, the MAC head indicates it with the same field length (7 bits or 15 bits) as the MAC SDU. R is a reserved bit.

The UE obtains a location of an MCCH in a radio frame or a subframe according to a system broadcast message, and reads MBMS service ID fields in the MAC head from the radio frame or the subframe, i.e., reads MBMS service ID fields in respective MAC sub-heads. If the MBMS service ID=1111, then it indicates that the logical channel corresponding to the MAC SDU is an MCCH, and the UE can read control information in the MCCH from the MAC SDU according to the length of the MAC data field in a corresponding MAC sub-head; if the MBMS service ID=0000~1110, then it indicates that the logical channel corresponding to the MAC SDU is an MTCH, and the UE can read service information from the MAC SDU according to the length of the MAC data field in a corresponding MAC sub-head.

Figure 5:
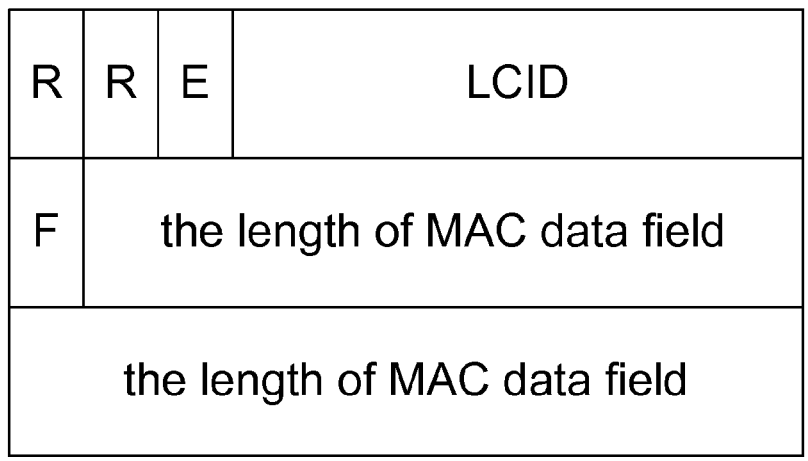
FIG. 5 is a schematic diagram illustrating an MAC sub-head structure according to the second embodiment of the present invention.

For an evolved application scenario, in which there may be various types of MBMS logical channels multiplexing on an MAC sublayer, for example, in a UTRA MBMS, there is also an MSCH which is a multicast logical channel, for indicating dynamic scheduling is information of a multicast service. Recently, an LTE Rel-9 MBMS has not yet determined whether to use an MSCH to indicate dynamic scheduling information. If an MSCH is not used, an MAC control element of an MAC sublayer can also be used to indicate dynamic scheduling information of the MBMS, and the MAC control element is behind the MAC head and in front of the MAC SDU. For the MAC head, regardless of implementation, it is required to be indicated in an LCID. For this scenario, an MCCH, an MTCH and an MSCH thus can be identified and distinguished by an LCID, specifically comprising:

setting a corresponding LCID in the MAC head by the eNB according to the type of a logical channel. The MAC head is composed of a large number of MAC sub-heads shown in FIG. 5, and the setting of the LCID is based on the following table.

TABLE 1

| Index | LCID values |
| --- | --- |
| 00000 | MCCH |
| 00001 | MSCH or MAC control element including MBMS scheduling information |
| 00010-11110 | MTCH |
| 11111 | Padding |

Wherein if LCID=00000, it indicates that the type of the logical channel is an MCCH; if LCID=00001, it indicates that the type of the logical channel is an Multicast Scheduling Channel (MSCH) or an MAC Control Element (CE) including MBMS scheduling information; if LCID=00010~11110, it indicates that the type of the logical channel is an MTCH; and if LCID=11111, it represents a padding indication.

An MAC E field is used to identify whether there is a field of indicating the length of an MAC data field in the MAC head or not. If E=1, then it indicates that the MAC head is extended, i.e., there is a field of indicating the length of the MAC data field in the MAC head; otherwise, it indicates that the MAC head is not extended, i.e., there is no field of indicating the length of the MAC data field in the MAC head.

In order to be consistent with the MAC head on the DL-SCH, the field of indicating the length of the MAC data field can be 15 bits or 7 bits, the specific value of which can be determined by a Flag (F) symbol in an MAC sub-head, i.e., if F=1, then the specific value is 15 bits; if F=0, then the specific value is 7 bits. The field of indicating the is length of the MAC data field is used to perform demarkation processing on different MAC SDUs in the MAC PDU. For an MAC control element, the MAC head indicates it with the same field length (7 bits or 15 bits) as the MAC SDU. R is a reserved bit.

The UE obtains a location of an MCCH in a radio frame or a subframe according to a system broadcast message, and reads LCID fields in the MAC head from the radio frame or the subframe, i.e., reads LCID fields in respective MAC sub-heads. If LCID=00000, then it indicates that the logical channel corresponding to the MAC SDU is an MCCH, and the UE can further read the content of the MCCH from the MAC SDU according to the length of an MAC data field in an MAC sub-head; if LCID=00001, then it indicates that the type of the logical channel is an MSCH or an MAC Control Element (CE) including MBMS scheduling information, and the UE can further read the content of the MSCH or the MAC control element from the MAC SDU according to the length of an MAC data field in respective MAC sub-heads; if LCID=00010~11110, then it indicates that the type of the logical channel is an MTCH, the UE can read required service data from the MAC SDU according to the length of an MAC data field in an MAC sub-head; and if LCID is 11111, then corresponding content is determined to be a padding part.

Figure 6:
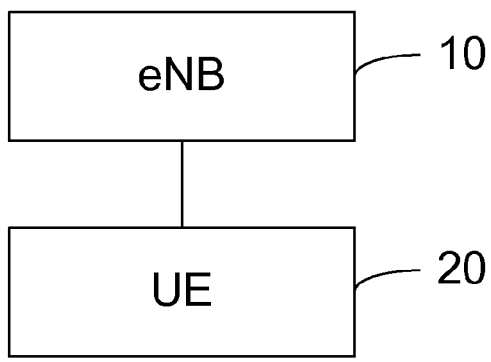
FIG. 6 is a schematic diagram illustrating constitution of a system for transmitting a logical channel identifier in an MBMS according to the present invention.

In order to realize the method for transmitting a logical channel identifier in an MBMS described above, the present invention also provides a system for transmitting a logical channel identifier in an MBMS, as shown in FIG. 6. The system includes an eNB 10 and a UE 20. The eNB 10 is used to notify the UE 20 of a radio frame or a radio subframe carrying an MCCH through a system broadcast message, and the UE 20 is used to read an MAC head from the radio frame or the radio subframe, identify the type of a logical channel according to the MAC head, and read data from an MAC SDU.

The UE 20 is further used to identify the type of the logical channel according to an MBMS service identifier or an LCID in the MAC head, specifically including:

determining that the type of the logical channel is an MCCH if the MBMS service identifier is 1111; and determining that the type of the logical channel is an MTCH if the MBMS service identifier belongs to 0000~1110; or determining that the type of the logical channel is an MCCH if the LCID is 00000; determining that the type of the logical channel is an MSCH or an MAC Control Element (CE) including MBMS scheduling information if the LCID is 00001; determining that the type of the logical channel is an MTCH if the LCID belongs to 00010~11110; and determining that corresponding content is a padding part if the LCID is 11111.

The UE 20 is also used to determine the location of data in the MAC SDU corresponding to the type of the logical channel according to a field of indicating the length of an MAC data field in the MAC head, and thus read data from the location.

The above descriptions are just preferable embodiments of the present invention, and are not used to limit the scope of the present invention.

What is claimed is:

1. A method for transmitting a logical channel identifier in a Multimedia Broadcast Multicast Service (MBMS), comprising:
   an evolved Node B (eNB) notifying a radio frame or a radio subframe carrying an MBMS Control Channel (MCCH) through a system broadcast message; and
   wherein the radio frame or the radio subframe is used to read a Medium Access Control (MAC) head from the radio frame or the radio subframe, to identify a type of a logical channel according to the MAC head, and to read MCCH data from an MAC Service Data Unit (SDU);
   wherein the type of the logical channel is identified according to an MBMS service identifier or a Logical Channel Identifier (LCID) in the MAC head;
   wherein the step that the type of the logical channel is identified according to an LCID specifically comprises:
   determining that the type of the logical channel is an MCCH if the LCID is 00000; and
   determining that corresponding content is a padding part if the LCID is 11111.

2. The method for transmitting a logical channel identifier in an MBMS of claim 1, wherein the step of reading MCCH data from an MAC SDU specifically comprises: determining a location of data in the MAC SDU corresponding to the type of the logical channel according to a field of indicating the length of an MAC data field in the MAC head, thus reading the data from the location.

3. A method for transmitting a logical channel identifier in a Multimedia Broadcast Multicast Service (MBMS), comprising:
   an evolved Node B (eNB) notifying a User Equipment (UE) of a radio frame or a radio subframe carrying an MBMS Control Channel (MCCH) through a system broadcast message; and
   the UE reading a Medium Access Control (MAC) head from the radio frame or the radio subframe, identifying a type of a logical channel according to the MAC head, and reading MCCH data from an MAC Service Data Unit (SDU);

wherein the UE identifies the type of the logical channel according to an MBMS service identifier or a Logical Channel Identifier (LCID) in the MAC head;

wherein the step that the UE identifies the type of the logical channel according to an LCID specifically comprises:

determining that the type of the logical channel is an MCCH if the LCID is 00000; and determining that corresponding content is a padding part if the LCID is 11111.

4. The method for transmitting a logical channel identifier in an MBMS of claim 3, wherein the step that the UE identifies the type of the logical channel according to an MBMS service identifier specifically comprises:

determining that the type of the logical channel is an MCCH if the MBMS service identifier is 1111; and determining that the type of the logical channel is a Multicast Traffic Channel (MTCH) if the MBMS service identifier belongs to 0000~1110.

5. The method for transmitting a logical channel identifier in an MBMS of claim 3, wherein the step of reading MCCH data from an MAC SDU specifically comprises: determining a location of data in the MAC SDU corresponding to the type of the logical channel according to a field of indicating the length of an MAC data field in the MAC head, thus reading the data from the location.

6. The method for transmitting a logical channel identifier in an MBMS of claim 4, wherein the step of reading MCCH data from an MAC SDU specifically comprises: determining a location of data in the MAC SDU corresponding to the type of the logical channel according to a field of indicating the length of an MAC data field in the MAC head, thus reading the data from the location.

7. A system for transmitting a logical channel identifier in a Multimedia Broadcast Multicast Service (MBMS), comprising an evolved Node B (eNB) and a User Equipment (UE), wherein the eNB, including a processor memory, is used to notify the UE of a radio frame or a radio subframe carrying an MBMS Control Channel (MCCH) through a system broadcast message; and the UE, including a processor memory, is used to read a Medium Access Control (MAC) head from the radio frame or the radio subframe, to identify a type of a logical channel according to the MAC head, and to read MCCH data from a MAC Service Data Unit (SDU);

wherein the UE is further used to identify the type of the logical channel according to an MBMS service identifier or an LCID in the MAC head;

wherein the UE is further used to determine that the type of the logical channel is an MCCH when the LCID is 00000, and to determine that corresponding content is a padding part when the LCID is 11111.

8. The system for transmitting a logical channel identifier in an MBMS of claim 7, wherein the UE is further used to determine that the type of the logical channel is an MCCH when the MBMS service identifier is 1111, and to determine that the type of the logical channel is an MTCH when the MBMS service identifier belongs to 0000~1110.

9. The system for transmitting a logical channel identifier in an MBMS of claim 8, wherein the UE is further used to determine a location of data in the MAC SDU corresponding to the type of the logical channel according to a field of indicating the length of an MAC data field in the MAC head, thus read the data from the location.

10. The system for transmitting a logical channel identifier in an MBMS of claim 7, wherein the UE is further used to determine a location of data in the MAC SDU corresponding to the type of the logical channel according to a field of indicating the length of an MAC data field in the MAC head, thus read the data from the location.

11. A User Equipment (UE) including a processor memory, comprising a receiving unit and a reading unit, wherein:

the receiving unit is used to receive a system broadcast message; and the reading unit is used to read a Medium Access Control (MAC) head from a radio frame or a radio subframe carrying an MBMS Control Channel (MCCH) which is notified by the system broadcast message, to identify a type of a logical channel according to the MAC head, and to read MCCH data from an MAC Service Data Unit (SDU);

wherein the reading unit is used to identify the type of the logical channel according to an MBMS service identifier or a Logical Channel Identifier (LCID) in the MAC head;

wherein the reading unit is further used to determine that the type of the logical channel is an MCCH if the LCID is 00000, and to determine that corresponding content is a padding part if the LCID is 11111.

12. A method for transmitting a logical channel identifier in a Multimedia Broadcast Multicast Service (MBMS), comprising:

a User Equipment (UE) reading a Medium Access Control (MAC) head from a radio frame or a radio subframe, identifying a type of a logical channel according to the MAC head, and reading MCCH data from an MAC Service Data Unit (SDU);

wherein the UE is notified of the radio frame or the radio subframe carrying an MBMS Control Channel (MCCH) through a system broadcast message;

wherein the UE identifies the type of the logical channel according to an MBMS service identifier or a Logical Channel Identifier (LCID) in the MAC head;

wherein the step that the UE identifies the type of the logical channel according to an LCID specifically comprises:

determining that the type of the logical channel is an MCCH if the LCID is 00000; and determining that corresponding content is a padding part if the LCID is 11111.

13. The method for transmitting a logical channel identifier in an MBMS of claim 12, wherein the step of reading MCCH data from an MAC SDU specifically comprises: determining a location of data in the MAC SDU corresponding to the type of the logical channel according to a field of indicating the length of an MAC data field in the MAC head, thus reading the data from the location.

\* \* \* \* \*

UNITED STATES PATENT AND TRADEMARK OFFICE
CERTIFICATE OF CORRECTION

PATENT NO. : 8,649,311 B2
APPLICATION NO. : 13/257867
DATED : February 11, 2014
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 239 days.

Signed and Sealed this
Twenty-ninth Day of September, 2015

Michelle K. Lee
*Director of the United States Patent and Trademark Office*